United States Patent [19]

Finn et al.

[11] Patent Number: 5,725,823
[45] Date of Patent: Mar. 10, 1998

[54] METHOD OF MAKING A SHOE SOLE HAVING CO-MOLDED ANTI-SKID INSERT

[75] Inventors: Norman H. Finn, Newton, Mass.; Chih-Ming Wu, Taipei, Taiwan

[73] Assignee: AmAsia International Ltd., Burlington, Mass.

[21] Appl. No.: 711,792

[22] Filed: Sep. 10, 1996

Related U.S. Application Data

[62] Division of Ser. No. 502,414, Jul. 14, 1995, abandoned.

[51] Int. Cl.$^6$ .............................. B29C 39/12; A43B 13/14
[52] U.S. Cl. .......................... 264/247; 264/244; 264/245; 264/255; 36/31
[58] Field of Search .............................. 264/244, 247, 264/245, 255; 36/31

[56] References Cited

U.S. PATENT DOCUMENTS

| | | | |
|---|---|---|---|
| 4,012,855 | 3/1977 | Gardner | 36/29 |
| 4,309,376 | 1/1982 | Ueno et al. | 264/241 |
| 4,398,357 | 8/1983 | Batra | 36/30 A |
| 4,658,516 | 4/1987 | Beck | 36/59 B |
| 5,024,007 | 6/1991 | DuFour | 36/127 |
| 5,465,507 | 11/1995 | Schumacher et al. | 36/30 R |

FOREIGN PATENT DOCUMENTS

| | | |
|---|---|---|
| 3165702 | 7/1991 | Japan. |
| 7143903 | 6/1995 | Japan. |

*Primary Examiner*—Jan H. Silbaugh
*Assistant Examiner*—Suzanne E. Mason
*Attorney, Agent, or Firm*—Fish & Neave; Jeffrey H. Ingerman

[57] ABSTRACT

A method of forming a shoe sole having a co-molded anti-skid insert is provided. Raw unvulcanized rubber sheet material for the insert, and raw unvulcanized rubber sheet material for the main portion of the sole are placed in a mold and heated to fuse them together, to vulcanize the rubber, and to produce an anti-skid pattern on the insert. The material of the insert is preferably substantially the same as that of the main portion of the sole, except for its color; however, it has the appearance and texture of a separate insert.

12 Claims, 3 Drawing Sheets

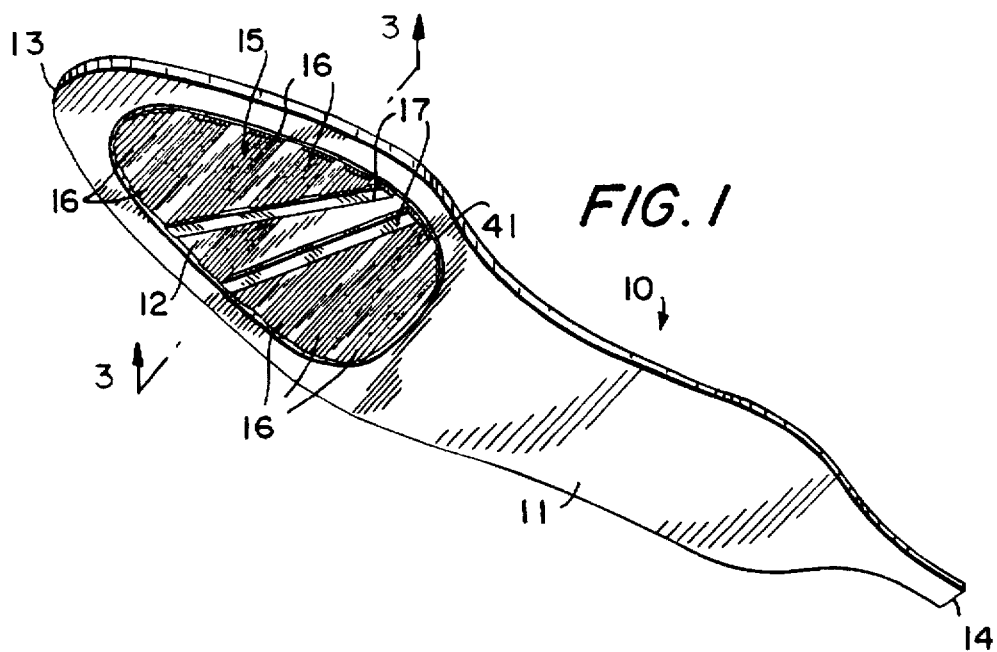
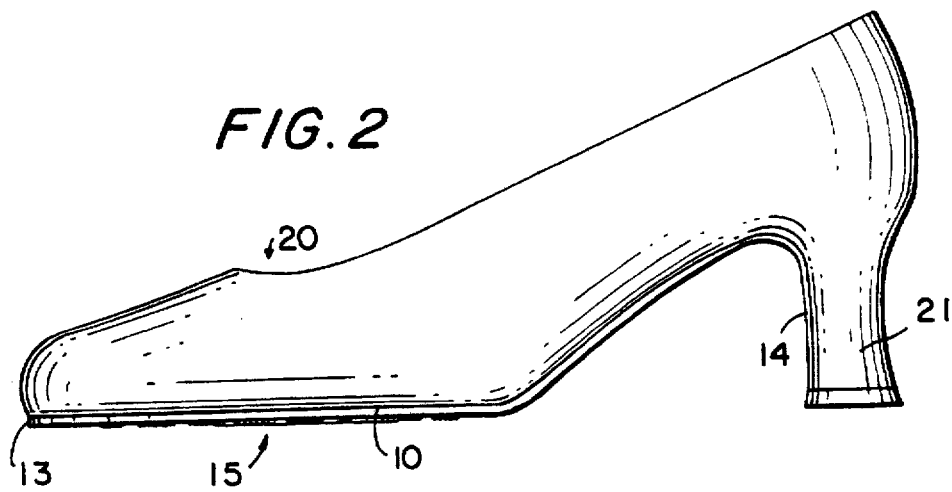
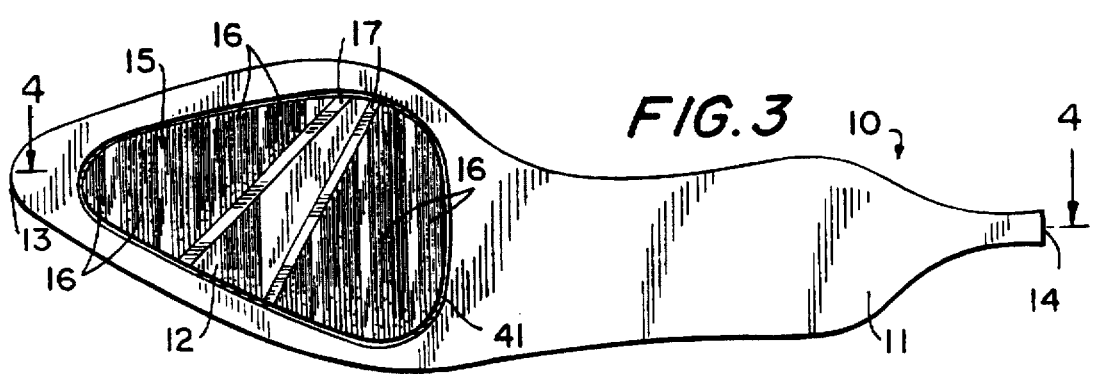

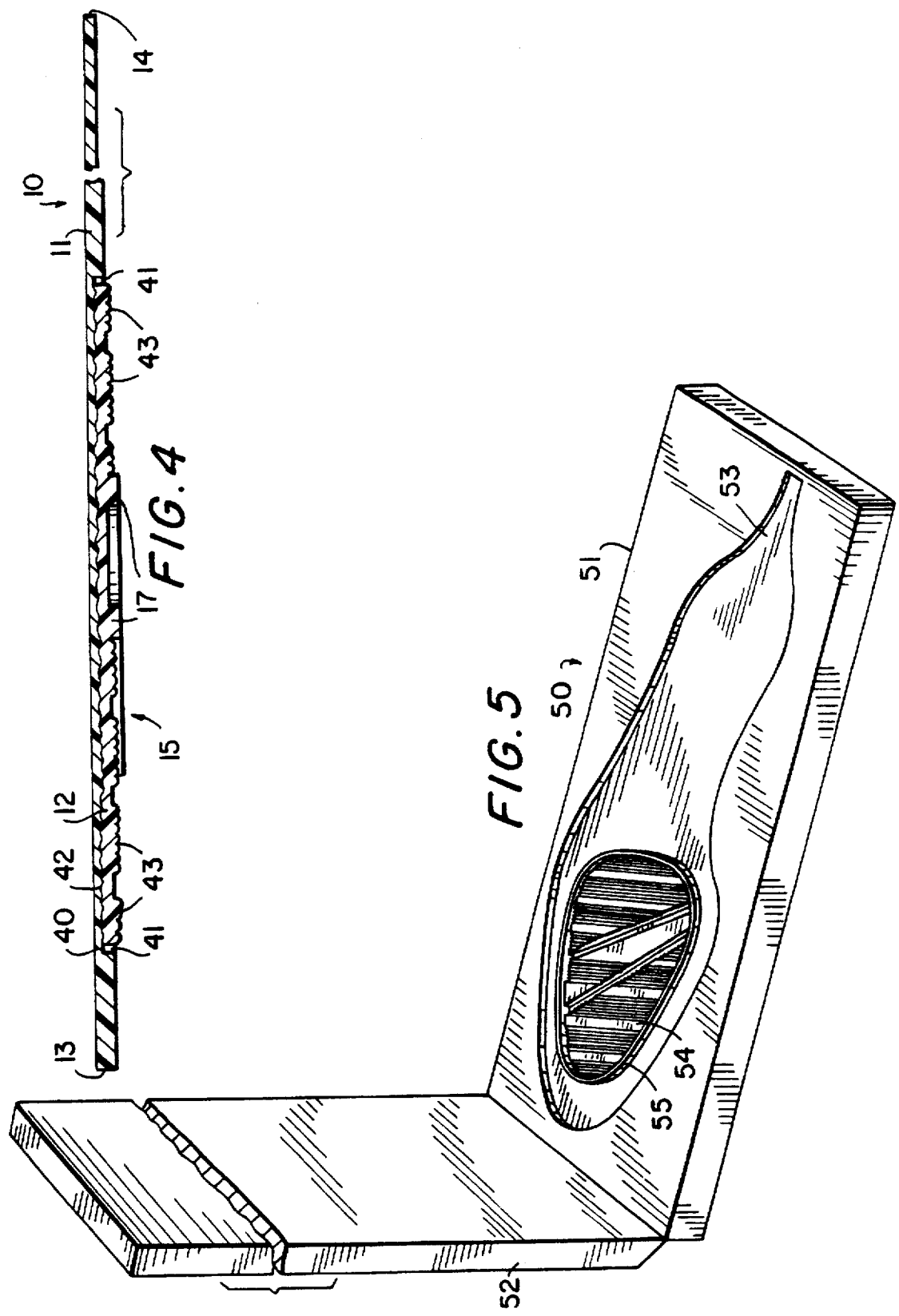

METHOD OF MAKING A SHOE SOLE HAVING CO-MOLDED ANTI-SKID INSERT

CROSS REFERENCE TO RELATED APPLICATIONS

This is a division of commonly-assigned U.S. patent application Ser. No. 08/502,414, filed Jul. 14, 1995, now abandoned.

BACKGROUND OF THE INVENTION

This invention relates to man-made shoe soles. More particularly, this invention relates to a man-made shoe sole having an anti-skid insert co-molded with the remainder of the sole.

Although athletic and some casual shoes have had patterned soles with at least adequate traction, other casual shoes, as well as dress shoes, have had smooth soles. This is true of both natural leather soles, as well as synthetic soles such as those of sueded rubber. Such soles do not necessarily offer optimum traction, and on certain surfaces, such as wet surfaces, wearers of shoes having such soles may slip.

It is known to cut an opening in a shoe sole, particularly a leather shoe sole, and affix, as by gluing, a rubber insert that protrudes beyond the surface of the sole, to provide additional traction. However, the production of such soles is relatively time-consuming and labor-intensive as compared to the production of smooth soles, requiring time to cut the sole, apply the glue and wait for the glue to set. The additional time and labor required are particularly significant in the case of synthetic soles, which are produced rapidly on automated equipment.

It would be desirable to be able to produce a synthetic shoe sole having an anti-skid insert without having to cut an opening into a sole, apply glue or wait for it to set.

It would also be desirable to be able to produce such a sole by co-molding.

It would further be desirable to be able to produce such a sole that had the appearance of a having a separate anti-skid insert.

SUMMARY OF THE INVENTION

It is an object of this invention to produce a synthetic shoe sole having an anti-skid insert without having to cut an opening into a sole, apply glue or wait for it to set.

It is also an object of this invention to produce such a sole by co-molding.

It is further an object of this invention to produce such a sole that has the appearance of a having a separate anti-skid insert.

In accordance with this invention there is provided a shoe sole comprising a main sole portion made of a first polymeric material and having a recess therein, and an insert portion made of a second polymeric material co-molded with the main sole portion and located in the recess. The insert portion is preferably made of the same material as the main portion, but is preferably dyed differently to appear as a separate insert.

A method of producing the sole by co-molding is also provided.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 1 is a bottom perspective view of a preferred embodiment of a shoe sole according to the invention;

FIG. 2 is a side elevational view of the shoe sole of claim 1 incorporated into a shoe;

FIG. 3 is a bottom plan view of the shoe sole of FIG. 1, taken from line 3—3 of FIG. 1;

FIG. 4 is a vertical cross-sectional view of the shoe sole of FIGS. 1 and 3, taken from line 4—4 of FIG. 3;

FIG. 5 is a perspective view of a preferred embodiment of a mold used in the manufacture of the shoe sole according to the invention.

DETAILED DESCRIPTION OF THE INVENTION

Figure 6:
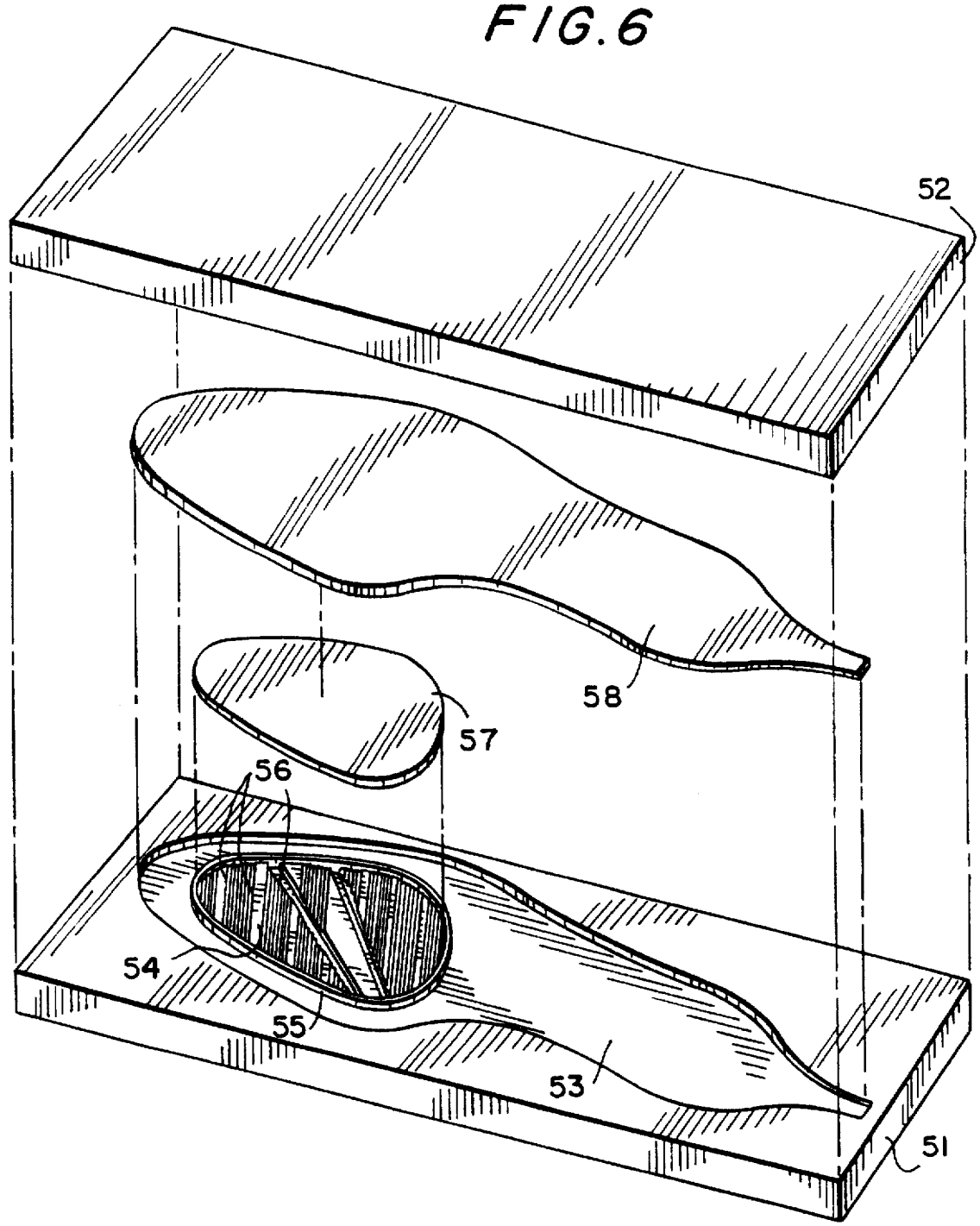
FIG. 6 is an exploded perspective view of the mold of FIG. 5 with uncured rubber sheets for manufacture of the shoe sole according to the invention.

The shoe sole of the present invention is a synthetic shoe sole having a co-molded anti-skid insert—i.e., the main portion of the sole and the anti-skid insert are molded together in the same molding step. The main portion and the insert may be made from completely different shoe sole materials. However, in a particularly preferred embodiment of the invention, the insert is of the same synthetic shoe sole material as the main portion of the sole, except that it contains a different dye, to give it a different appearance. The appearance is such that the insert appears to be a truly separate insert.

The difference in appearance between the main portion of the sole and the insert, as well as the anti-skid properties of the insert, are preferably enhanced by providing a different surface treatment on the insert as compared to the main portion of the sole. The sole is preferably given a smooth surface finish similar to that of a natural leather sole (known as a "sueded" finish), while the insert is preferably given a raised pattern having an anti-skid configuration. Most preferably, the main portion of the sole is colored the same color as natural leather soles (e.g., beige), while the insert is colored a different color (e.g., a darker tan color). The insert thus differs from the main portion of the sole in both color and texture.

The sole of the invention is preferably made in a mold having substantially uniform depth, which may taper to a reduced depth toward the heel end in cases where the sole at that end is merely decorative and has a reduced thickness. Within the mold is preferably an area corresponding to the insert and having a wall around it. The height of the wall is sufficient to leave a well-defined groove around the insert, but is low enough that the insert remains connected to the remainder of the sole by material that extends over the wall. The insert area of the mold has a pattern at the bottom for imparting to the insert the anti-skid surface treatment referred to above. That pattern is preferably a series of raised ribs. The depth of the mold in the area of the elements of the pattern is preferably slightly greater than that of the remainder of the mold so that the ribs or other pattern elements are in fact raised and protrude from the surface of the sole.

The mold is preferably pre-heated to a temperature of between about 130° C. and about 160° C. Material for the insert is first inserted in the insert area of the mold. The preferred material is an unvulcanized rubber sheet, which preferably is cut slightly smaller than the insert area of the mold, because it will expand during molding. Next, the material for the main portion of the sole is placed in the mold, overlying the insert material. This material again is preferably unvulcanized rubber sheet, and again, the sheet is preferably cut slightly smaller than the mold to allow for expansion during the molding process.

The mold is then closed and heat and pressure are applied. Preferably, the mold is heated to a temperature of between about 140° C. and about 160° C., most preferably about 150° C., while pressure of between about 40 kg/cm$^2$ and about 160 kg/cm$^2$, most preferably about 150 kg/cm$^2$ is applied, preferably for a duration of between about 5 minutes to about 7 minutes, most preferably about 6 minutes. As a result of the molding process, the main sole material in the area of the insert is forced aside by the insert material, but because the insert material is thinner than the main sole material, the insert remains connected to the main sole by a thin layer of the main sole material overlying the insert. The wall of the insert area of the mold leaves a well defined groove surrounding the insert and separating it from the main portion of the sole. Under the application of heat and pressure, the insert material and the main sole material are fused together by melting where they meet, and the materials are vulcanized.

The sole is removed from the mold for further processing and manufacturing into a shoe. The mold could be designed to produce a sole of a particular type and size, so that every size and style of shoe requires its own sole mold. Alternatively, and more preferably, the mold could be designed to make a sole that is larger than necessary (it would have to have the desired thickness), and is then die-cut, or otherwise trimmed, to the desired size.

Preferably, the main sole material and the insert material are the same, except that they are dyed different colors. A particularly preferred material is rubber that is commonly used for synthetic shoe soles. The material may include synthetic rubber such as that available under the name TUFDENE® 2003 from Asahi Chemical Industry Company, Ltd., of Osaka, Japan, that available under the name SBR® 1502 from The Dow Chemical Company, of Midland, Mich., or that available under the name UBEPOL® 01501 from Ube Industries, Ltd., of Ube City, Japan, as well as natural rubber such as that available under the name NITRI-FLEX™ 36H from Besaplast Kunststoffe GmbH, of Borken, Germany. The rubber is preferably compounded with a filler, such as that available under the name ULTRASIL® VN3 from Degussa AG, of Frankfurt, Germany, as well as a pigment available from E.I. Du Pont de Nemours and Company, of Wilmington, Del., under the name TI-PURE™ R-103. An appropriate dye is added to the rubber for each portion of the sole.

A preferred embodiment of the shoe sole according to this invention is shown in FIGS. 1–4. Sole 10 as described herein is for a woman's high-heeled shoe 20 (FIG. 2), but the principles of the invention apply equally to low-heeled and men's shoes.

Sole 10 has a main portion 11 and an insert portion 12. Main portion 11 has a substantially uniform thickness, although in the preferred embodiment shown, main portion 11 is thicker at front or toe end 13, tapering to a reduced thickness at rear or heel end 14 which is provided merely as a cosmetic covering over the front of heel 21, so that substantial thickness is not required. For other styles of shoes, however, the sole may be substantially uniform in thickness, or may even be thicker at the heel end.

Main portion 11 also has a recess 40 therein, in which insert portion 12 is located. Recess 40 is larger than insert portion 12, so that a groove 41 surrounds insert portion 12. Insert portion 12 and main portion 11 are fused together, as indicated by wavy line 42.

Each of main portion 11 and insert portion 12 is made from a polymeric material. As discussed above, the two polymeric materials are preferably substantially identical—i.e., both are preferably rubber of the type described above—except for the dye used in each. As also discussed above, main portion 11 is preferably dyed to resemble a leather shoe sole (e.g., beige) while insert portion 12 is preferably dyed to resemble a rubber insert (e.g., a darker tan color). However, main portion 11 and insert portion 12 could be made from dissimilar polymeric materials. For example, insert portion 12 could be made from a softer rubber (e.g., crepe rubber) for greater traction (see below).

Although in the preferred embodiment main portion 11 and insert portion 12 are preferably made from substantially the same material, their surfaces are treated differently because they serve different functions. Main portion 11 is intended to resemble a traditional leather shoe sole, and accordingly preferably receives a substantially smooth surface treatment, known in the shoe industry as a "sueded" finish.

On the other hand, insert portion 12 is intended to serve as an anti-skid insert—i.e., an insert intended to reduce the tendency of the wearer of a shoe including sole 10 to slip on a smooth, wet or otherwise slippery surface. Accordingly, insert portion 12 is preferably provided with an anti-skid pattern 15 on its surface. Although pattern 15 could be provided on insert portion 12 before insert portion 12 is incorporated into sole 10, pattern 15 preferably is formed during the manufacture of sole 10. Pattern 15 preferably includes a series of parallel ribs 43 that are preferably grouped together in groups 16 and that preferably extend substantially laterally across insert portion 12. Pattern 15 preferably also includes a smaller number of larger obliquely angled ribs 17. Because each of ribs 43, 17 is has a very small contact area with the ground compared with the total area of sole 10, or even only of insert portion 12, the pressure exerted by ribs 43, 17 on the floor or ground as a user walks in shoe 20 is very high, increasing the traction of sole 10 as compared to a sole having no anti-skid provisions. The surface treatment given to insert portion 12, as described, actually gives insert portion 12 a different texture to the touch as compared to main portion 11, so that an observer will believe insert portion 12 to be of a different material than main portion 11.

The skid resistance of sole 10 can be further enhanced by making insert portion 12 from a softer rubber having greater traction even without pattern 15, such as crepe rubber. However, in the preferred embodiment the materials of portions 11, 12 are substantially the same.

The preferred method for making sole 10 is shown in FIGS. 5 and 6. A mold 50 is preferably provided having a lower portion 51 and a cover 52. Lower portion 51 has a main depression 53 and an insert depression 54, separated by a wall 55. Material for insert portion 12 is fed to insert depression 54, while material for main sole portion 11 is fed so that it lies in main depression 53, as well as overlying the insert material in insert depression 54. As discussed above, the materials are preferably sheets of raw unvulcanized rubber of the types described above. Cover 52 is then closed and heat and pressure are applied as discussed above. The heat causes the material in main depression 53 to fuse at 42 to that in insert depression 54. At the same time, the heat and pressure cause the two materials to be vulcanized, which prevents them from becoming too soft in heat or too brittle in cold.

Main depression 53 has a depth, corresponding to the final thickness of sole 10, that is substantially uniform across depression 53, but in the preferred embodiment tapers toward end 14 as discussed above. The depth of insert depression 54 is substantially the same as the depth of main depression 53 in the area immediately outside insert depression 54. However, insert depression 54 preferably has grooves 56 which form ribs 43, 17, and in those grooves 56 depression 54 is preferably deeper than main depression 53 so that ribs 43, 17 protrude beyond the surface of sole 10.

The shape of main depression 53 corresponds at least somewhat to the shape of the desired sole 10. As explained above, sole 10 can be molded in the exact shape desired, or can molded larger than any possible size or shape, and then cut, as by die-cutting or other techniques, into the precise shape and size desired.

Wall 55 separates main depression 53 from insert depression 54. The height of wall 55 is less than the depth of depression 53, so that a continuous layer of material extends over all of sole 10, connecting main portion 11 and insert portion 12. Wall 55 also results in a well defined groove around the outer edge of insert portion 12, which helps to give the appearance of a separate insert rather than a co-molding.

In the preferred embodiment, sole 10 is formed in mold 50 (which preferably has been pre-heated as described above) by providing a sheet 57 of insert material of the type described above and placing it in insert depression 54. As discussed above, depending on the material used, sheet 57 may be cut to fill insert depression 54 precisely, or it may be sized somewhat smaller than depression 54 with the expectation that it would expand during the molding process.

Next, a sheet 58 of main sole material is placed in depression 53, preferably overlying sheet 57; again, the sheet 58 may be sized to precisely match depression 53, or may be made smaller to accommodate expansion during molding.

Next, cover 52 is closed and heat and pressure as described above are applied to fuse sheets 57, 58 together where they meet and to vulcanize sheets 57, 58. As heat and pressure are applied, material in sheet 58 overlying insert depression 54 is forced outward by the presence of sheet 57, forming recess 40 which receives insert portion 12. There is substantially no mixing between the materials of sheets 57, 58, so that insert portion 12 appears to be made only from the insert material 57. The "expansion" of sheet 58 to fill depression 53 may be due in part to this displacement of material because of the presence of sheet 57, although some expansion also results from the vulcanization process.

After sole 10 has been formed as shown in FIGS. 5 and 6, it is processed further as necessary for use in a shoe. For example, it may be necessary, as discussed above, to cut sole 10 to the correct size. In addition, a colored edge may be applied for a more finished look. These steps are performed conventionally.

Thus it is seen that a synthetic shoe sole having an anti-skid insert that can be produced by co-molding, without having to cut an opening into a sole, apply glue or wait for it to set, and which has the appearance of a having a separate anti-skid insert, has been provided. One skilled in the art will appreciate that the present invention can be practiced by other than the described embodiments, which are presented for purposes of illustration and not of limitation, and the present invention is limited only by the claims which follow.

What is claimed is:

1. A method of making a shoe sole of first and second polymeric materials, said shoe sole having an anti-skid insert of said first polymeric material, said method comprising the steps of:

providing a mold having a main depression having a shape corresponding to a shape of said shoe sole and an insert depression having a shape corresponding to a shape of said insert, said insert depression having a depth and being separated from said main depression by a raised wall surrounding said insert depression, said raised wall having a height less than said depth;

feeding said first polymeric material into said insert depression in said mold within said raised wall;

feeding said second polymeric material into said main depression in said mold outside said raised wall, and overlying said first polymeric material in said insert depression within said raised wall; and closing said mold and applying heat and pressure to said first and second polymeric materials in said mold to form a recess in said second polymeric material within which said first polymeric material is located and to laterally separate said first polymeric material from said second polymeric material by a groove formed by said raised wall, thereby forming said shoe sole having said insert.

2. The method of claim 1 wherein each of said feeding steps comprises feeding a sheet of polymeric material into said mold.

3. The method of claim 1 wherein said step of feeding a second polymeric material comprises feeding a second polymeric material that differs from said first polymeric material by addition of a dye.

4. The method of claim 1 wherein each of said feeding steps comprises feeding rubber.

5. The method of claim 1 wherein said applying heat comprises heating said polymeric materials to a temperature of from about 140° C. to about 160° C.

6. The method of claim 5 wherein said temperature is about 150° C.

7. The method of claim 1 wherein said applying pressure comprises applying a pressure of from about 40 kg/cm$^2$ to about 160 kg/cm$^2$.

8. The method of claim 7 wherein said pressure is about 150 kg/cm$^2$.

9. The method of claim 1 wherein said applying heat and pressure is carried out for a duration of from about 5 minutes to about 7 minutes.

10. The method of claim 9 wherein said duration is about 6 minutes.

11. The method of claim 1 wherein said applying heat is carried out for a duration of from about 5 minutes to about 7 minutes.

12. The method of claim 11 wherein said duration is about 6 minutes.

* * * * *